Patented Aug. 17, 1948

2,447,456

UNITED STATES PATENT OFFICE 2,447,456

PROCESS FOR THE PREPARATION OF 2-ACETONYLAZOLES

Alfred W. Anish, Vestal, and Charles A. Clark, Binghamton, N. Y., assignors to General Aniline & Film Corporation, New York, N. Y., a corporation of Delaware No Drawing. Application January 18, 1945, Serial No. 573,462

11 Claims. (Cl. 260—298)

This invention relates to a new process for the preparation of 2-acetonylazoles.

It is known that omega-acyl azoles can be prepared by (1) reducing o-o'-di(acyl-acetamido) diaryl disulfide under acid conditions, (2) by reacting an o-diamine of the benzene series with an alkylacetic or aroylacetic ester in an inert solvent and in the presence of an alkaline catalyst, or (3) by reacting acyl acetic esters (such as ethylacetoacetate) with an aromatic amine containing a mercapto or selenyl group in ortho-position.

At the present time there is no satisfactory method for preparing 2-acetonylazoles in yields sufficient to warrant commercial production. An attempt to prepare 2-acetonylazoles by the first of the above methods gave a poor yield as low as 6% overall. Again when using the quantities and technique of the second and third methods very poor yields were obtained. Moreover, aside from the poor yields, these methods possess the disadvantages that:

(a) The time required for the reaction to go to completion, is long.

(b) The final product is contaminated with objectionable by-products.

(c) The reaction product is not readily isolated.

It is an object of the present invention to overcome these and other undesirable disadvantages and to provide a new method of preparing 2-acetonylazoles.

Other objects and advantages of the invention will become more apparent as the description proceeds.

The objects outlined above are accomplished by condensing diketene with a primary arylamine in which the aryl ring in ortho-position to the amino group contains a substituent such as mercapto or selenyl group. The aryl ring may also be further substituted by alkyl, e. g., methyl, ethyl, propyl, butyl, hexyl, octyl and the like, aryl, e. g., phenyl, naphthyl, diphenyl, etc., aralkyl, e. g., benzyl, methylbenzyl, ethylbenzyl, etc., carboxylic acyl, including aliphatic acyl, e. g., acetyl, butyroyl, lauroyl, stearyl, caproyl and the like. The aryl ring may also have one or more of the usual water solubilizing groups, e. g., hydroxyl, arsonic, carboxylic, and sulfonic acid groups, or one or more other groups, e. g., hydrocarbon, alkoxy, halogen, e. g., chlorine, bromine or iodine.

According to the present invention, these compounds are prepared by heating under reflux one mol of an aromatic primary amino compound containing a mercapto or selenyl group in ortho-position, with 1 to 1½ mols of diketene in the presence of a solvent-diluent, such as, for example, an aromatic hydrocarbon, or an oxygenated hydrocarbon, from 2 to 4 hours until ring closure ensues. The reaction mixture is then cooled, filtered, and the product recrystallized. Instead of employing a solvent-diluent for the reaction, the reactants may be suspended in water and the aqueous suspension heated at a temperature ranging from 80° C. to 100° C. for a period of from 1 to 4 hours.

As examples of suitable aromatic primary amino compounds containing a mercapto or selenyl group in ortho-position, which for convenience will be referred to hereinafter as aromatic primary o-aminophenols, may be mentioned o-aminothiophenol, o-aminothionaphthol, o-aminoselenylbenzene, o-aminoselenylnaphthalene, 2-amino-4-methoxythiophenol, 2-amino-3-methoxythiophenol, o-aminochlorthiophenol, o-aminoselenylnaphthalene, o-amino-4-propoxyselenylnaphthalene and the like.

Various structural formulae for diketene have been proposed in the literature (Ind. and Eng. Chem., 32, p. 16, 1940). The structures proposed are the following:

(1)   $H_2C-C=O$
      $\phantom{H_2C}|\phantom{-C}|$
      $O=C-CH_2$ (2)   $CH_3COCH=C=O$ (3)   $H_3C-C=CH$
      $\phantom{H_3C}|\phantom{-C}|$
      $O-C=O$ (4)   $H_2C=C-CH_2$
      $\phantom{H_2C=}|\phantom{-C}|$
      $O-C=O$ During the experimentation with and the practicing of this invention, we have concluded that regardless of the structure of diketene the commercially available product will condense with an aromatic primary o-aminophenol to give a product characterized by a structure corresponding to the following general formula:

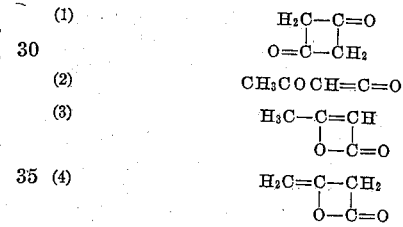

wherein X is either sulfur or selenium and R is a substituent of the same type as previously set forth.

The condensation between diketene and the aromatic primary o-aminophenol is carried out first, by dissolving the latter reactant in a suitable solvent-diluent such as an aromatic hydrocarbon for example, toluene, chlorobenzene, cyclohexane, cycloheptane, cyclooctane, benzene, o, m, and p-xylene, ethylbenzene, 1,2,4-trimethylbenzene, propylbenzene, 1,3-ethyl methylbenzene or an oxygenated solvent such as ethyl methyl ketone, diethyl ketone, methyl propyl ketone, allylacetone, mesityl oxide, dioxane and the like, and then cooling the mixture to room temperature. Diketene is then added to the cooled mixture, dropwise, during the first 30 minutes. The reaction proceeds with the evolution of heat and after it has subsided, the mixture is allowed to stand for an additional 30 minutes and then refluxed for about 2 to 10 hours. The reaction mixture is then cooled, the precipitated product washed with ether and recrystallized from methyl or ethyl alcohol or from any one of the compounds employed as a solvent-diluent for the condensation reaction. The ratio of reactants is one mol of aromatic primary o-aminophenol to 1 or 1½ mols of diketene. The desirable ratio of diketene, however, is in the range of 1.1 to 1 mols of aromatic primary o-aminophenol.

Of these various classes of solvent-diluents mentioned above, the aromatic hydrocarbons are by far the most practical and, therefore, preferred in view of their relative cheapness. It is to be noted, however, that solvent-diluents other than above mentioned may also be employed, the selection depending more or less on the inertness of the selected solvent-diluent to diketene, with which it should not react.

Specific compounds which have been prepared by the reactions hereinafter described are the following, it being understood that they are exemplary only and that they may contain other substituent groups as well as those previously set forth:

2-acetonylbenzothiazole
2-acetonylbenzoselenazole
2-acetonyl-5-methylbenzothiazole
2-acetonyl-5-methoxybenzothiazole
2-acetonyl-5,6-dimethylbenzothiazole
2-acetonyl-5-chlorobenzothiazole
2-acetonyl-5,6-methylenedioxybenzothiazole
2-acetonyl-5-methoxybenzoselenazole The following examples are intended to illustrate the preparation of the compounds disclosed above. It will be appreciated that the conditions of reactions, e. g., proportion of co-reactants, times of reaction and temperature may be varied and that supplementary processes of purification may be resorted to wherever found desirable. These and other variations and modifications will be evident to those skilled in the art in the light of the guiding principles disclosed herein. The parts are by weight unless otherwise stated.

*Example I*

2-acetonylbenzothiazole

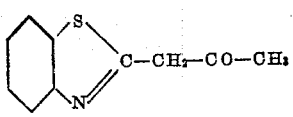

Diketene, B. P. 68°/92 mm_____parts__ 9.2
o-Aminothiophenol,
B. P. 100–103°/3 mm_____do____ 12.5
Benzene_____parts by volume__ 10.0

The o-aminothiophenol was dissolved in benzene and the mixture poured into a reaction vessel fitted with a water-cooled condenser. Diketene was then added slowly through the condenser at a rate of about 5–6 drops per minute. A lag period of several minutes may occur before the first portion of diketene causes an evolution of heat. When the reaction heat subsided, it was then refluxed an additional 60 minutes on an oil bath. The condenser was then removed and the water formed in the reaction mixture was boiled off by continuing the boiling for 15–30 minutes. The product crystallized on cooling and was recrystallized from chlorobenzene. Yield 12.0 parts. M. P. 120° C. 62.8% yield.

*Example II*

2-acetonylbenzoselenazole

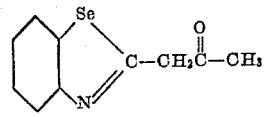

(A) o-Aminoselenylbenzene _____parts__ 13.5
(B) Diketene _____do____ 8.0
(C) o-Xylene_____parts by volume__ 100.0

(A) was dissolved in 100 parts by volume of solvent (C) and cooled to room temperature. A condenser was attached and the diketene added dropwise through the condenser during a period of 30 minutes. The reaction proceeded with evolution of heat. The mixture was allowed to stand an additional 30 minutes and was then refluxed 2 hours in an oil bath. The condenser was removed and 50 parts by volume of ortho-xylene distilled off. The hot residue was poured into a container and crystallized on cooling. The product was dissolved in dilute alkali and then treated with activated carbon and neutralized with acetic acid. The product was recrystallized from petroleum ether.

*Example III*

2-acetonyl-6-methoxybenzothiazole

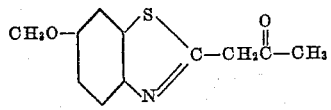

| | Parts |
|---|---|
| 2-amino-5-methoxythiophenol | 10.0 |
| Diketene | 7.0 |

The 2-amino-5-methoxythiophenol was dissolved in a minimum amount of toluene and cooled. The diketene was then added, dropwise, through the condenser at such a rate that the temperature did not exceed 100° C. after which the reaction mixture was refluxed for 2 hours. The condenser was removed and the water formed in the reaction mixture was boiled off. The reaction mixture was then allowed to stand overnight.

The solvent was removed under vacuum. The product was distilled at 2 mm. Hg pressure for optimum yield. At 72 mm. and at a temperature of 120–140° C. a distillate was obtained with some decomposition. The oily distillate crystallized overnight. The crystals were filtered, washed with petroleum ether-benzene (50–50) mixture. 2.5 parts of product was obtained. (17.4% yield.)

*Example IV*

2-acetonylbenzothiazole

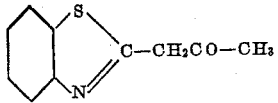

12.5 grams of o-aminothiophenol was suspended in 50 cc. of water, and to this 10 grams of diketene added in several portions during a period of about 5 minutes. The container was swirled manually for a few minutes until the reaction heat subsided and was then warmed on a steam bath for 1 hour. After cooling, the orange colored oil solidified, the water was filtered off and the solid product recrystallized twice from alcohol. Yield, 7.0 gms. or 36.6%.

While the present invention has been described in considerable detail with reference to certain preferred procedures and materials, it is to be understood that all relative modifications and variations are within the scope of the invention as defined by the appended claims.

We claim:

1. The process of producing 2-acetonylazoles which comprises heating diketene with an aromatic primary amine, containing in the ortho-position to the amino group a substituent having a replaceable hydrogen atom and selected from the class consisting of mercapto and selenyl, in the presence of a solvent-diluent capable of dissolving diketene and the said primary amine, and which is inert to diketene, until ring closure is obtained.

2. The process which comprises heating diketene with o-aminothiophenol in the presence of a solvent-diluent, capable of dissolving diketene and the said primary amine and which is inert to diketene, until ring closure is obtained.

3. The process which comprises heating diketene with o-aminoselenylbenzene in the presence of a solvent-diluent capable of dissolving diketene and the said primary amine, and which is inert to diketene, until ring closure is obtained.

4. The process which comprises heating diketene with 2-amino-5-methoxythiophenol in the presence of a solvent-diluent, capable of dissolving diketene and the said primary amine and which is inert to diketene, until ring closure is obtained.

5. The process as defined in claim 1 in which the amino group of the aromatic primary amine is attached to a phenyl radical.

6. The process according to claim 2 wherein the heating is conducted in the presence of benzene.

7. The process according to claim 3 wherein the heating is conducted in the presence of o-xylene.

8. The process according to claim 4 wherein the heating is conducted in the presence of toluene.

9. The process as defined in claim 1 in which the amino group of the aromatic primary amine is attached to a thiophenol in the ortho-position.

10. The process as defined in claim 1 in which the amino group of the aromatic primary amine is attached to a selenylbenzene in the ortho-position.

11. The process according to claim 1 wherein the solvent-diluent is an aromatic hydrocarbon.

ALFRED W. ANISH.
CHARLES A. CLARK.

REFERENCES CITED

The following references are of record in the file of this patent:

UNITED STATES PATENTS

| Number | Name | Date |
| --- | --- | --- |
| 2,174,239 | Gleason | Sept. 26, 1939 |
| 2,323,504 | Wilson | July 6, 1943 |